United States Patent [19]

McKay et al.

[11] Patent Number: 5,593,773
[45] Date of Patent: Jan. 14, 1997

[54] METAL POWDER PIGMENT

[75] Inventors: Colin F. McKay; Angela McKay; Eric S. Ringan, all of Fife, United Kingdom

[73] Assignee: Silberline Limited, Edinburgh, Scotland

[21] Appl. No.: 373,293

[22] PCT Filed: Jul. 23, 1993

[86] PCT No.: PCT/GB93/01562

§ 371 Date: Mar. 9, 1995

§ 102(e) Date: Mar. 9, 1995

[87] PCT Pub. No.: WO94/02551

PCT Pub. Date: Feb. 3, 1994

[30] Foreign Application Priority Data

Jul. 23, 1992 [GB] United Kingdom ............... 9215709

[51] Int. Cl.$^6$ .................................................. B32B 5/16
[52] U.S. Cl. ................... 428/328; 106/287.17; 428/332; 428/402; 428/913
[58] Field of Search ................... 428/328, 332, 428/402, 913; 106/404, 287.17, 903; 75/343, 351, 370, 392, 342

[56] References Cited

U.S. PATENT DOCUMENTS

| | | | |
|---|---|---|---|
| 1,569,484 | 1/1926 | Hall | 106/403 |
| 3,610,741 | 10/1971 | Davies et al. | 350/320 |
| 3,901,688 | 8/1975 | Casey et al. | 75/0.5 R |
| 3,941,584 | 3/1976 | Tundermann et al. | 75/0.5 R |
| 4,315,770 | 2/1982 | Nadkarni | 75/0.5 BC |
| 4,318,747 | 3/1982 | Ishijima et al. | 106/209 |
| 4,484,951 | 11/1984 | Uchimura et al. | 106/290 |
| 4,486,225 | 12/1984 | Osborn et al. | 75/0.5 R |
| 4,629,512 | 12/1986 | Kondis | 106/290 |
| 4,936,913 | 6/1990 | Hieda | 106/404 |
| 5,127,951 | 7/1992 | Imasato et al. | 106/404 |

FOREIGN PATENT DOCUMENTS

| | | |
|---|---|---|
| 2551764 | 3/1985 | France . |
| 5-117722 | 5/1993 | Japan . |

Primary Examiner—Hoa T. Le
Attorney, Agent, or Firm—Quarles & Brady

[57] ABSTRACT

The invention provides a metal powder pigment. In one aspect it comprises polished atomized pigment particles of aluminum or an aluminum alloy which are facetted and have a median particle size of from 1 to 300 μm and an aspect ratio of from 5/1 to 1.1/1. The polished atomized metal powder particles have an increased reflectivity with respect to unpolished atomized metal powder particles of at least 10%. The pigment of the invention can be used to provide novel visual effects in single and multilayer coating systems.

8 Claims, 1 Drawing Sheet

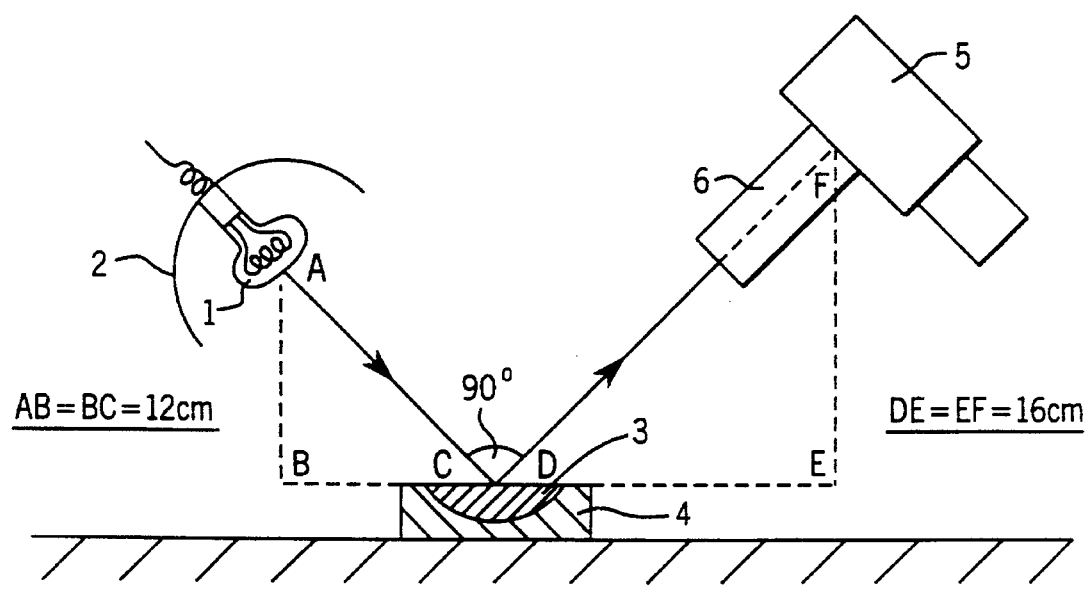

METAL POWDER PIGMENT

BACKGROUND OF THE INVENTION

FIELD OF THE INVENTION

The present invention relates to a metal powder pigment, its preparation and its use in coating systems to provide novel visual effects.

Metal powder may be prepared in an atomizer (see for example U.S. Pat. No. 4,705,560). Conventional atomized powder produced in this way consists essentially of fairly uniform particles having a median particle size ($D_{50}$) of 1 to 300 μm, usually 3 to 75 μm, more usually 5 to 40 μm and an aspect ratio, that is ratio of largest dimension to smallest dimension, of about 1.5 to 5/1. By modification of the atomization process it is possible to reduce the aspect ratio towards unity, i.e. towards a perfect sphere. In practice, such so called spherical atomized powders are of similar diameters to the foregoing, but have aspect ratios of at most 1.5:1, more usually less than 1.3:1. By virtue of their sphericity, the sphere being the geometrical shape having the lowest ratio of surface area to volume, atomized metal powder particles have poor covering power and are dull and relatively non-reflective.

Metal flake pigment may be prepared from atomized metal powder by either wet or dry ball milling. In wet ball milling (see for example U.S. Pat. No. 1,569,484 and U.S. Pat. No. 3,901,688) metal powder is ball milled with an organic liquid such as mineral spirits and a small amount of a lubricant such as oleic acid or stearic acid, and the resulting flakes are separated, for example by wet sieving, to provide the desired particle size distribution and brought to a paste-like consistency of, typically, 55 to 80% by weight. In dry ball milling (see for example U.S. Pat. No. 4,115,107) metal powder is ball milled in the absence of liquid but inert gas is passed through the mill at such a rate that flake is removed as it is formed.

In these milling processes flakes are formed substantially instantaneously whenever an essentially spherical powder particle is trapped between milling media, usually polished metal balls which have a very high mass relative to that of the trapped particle. Thus even after only a short milling time, a sample removed from the mill base in a wet milling process will contain flakes in addition to the starting powder particles (which have not been trapped between the milling media).

The metal flakes produced in this way have a significantly different geometry to that of the starting, essentially spherical, powder particles. Commercially available metal flakes typically have a second largest dimension, measured at right angles to the largest dimension, of less than 150 μm, more usually 8 to 35 μm, and an average thickness, measured at right angles to the other two dimensions, of only 0.02 to 2 μm, more usually 0.05 to 1.5 μm, indeed generally less than 1 μm and often only about 0.1 μm. The metal flakes thus necessarily have a large aspect ratio, very rarely less than 10/1 and more commonly in a range from 15/1 to over 100/1. Thus lenticular flakes generally have aspect ratios of 25/1 to 100/1, while "cornflakes" may have aspect ratios of 100/1 and greater.

The use of metal flake pigments, especially aluminum or aluminum alloy flake pigments, in surface coating systems, such as automotive paints, is well known. As a consequence of their shape, metal flake pigments provide a visual effect in surface coatings, known as "flip" or "flop", wherein the colour depth of the coating alters according to the angle of viewing. A description of the origin of this effect and its measurement will be found in U.S. Pat. No. 4,590,235 and in EP-A-422357. Metal flake pigments are usually incorporated in surface coating systems at concentrations of 1 to 30% by weight, depending upon the intended application. A particularly important application for metal flake pigments, principally aluminum or aluminum alloy flake pigments, is in automotive paints and for this application it is well known to employ a two-coat system, wherein the flake pigment is laid down in a first coat and subsequently overcoated with a clear top coat. This so called base coat-clear system provides an improved appearance and resistance to weathering.

In recent years, there has developed an increasing consumer demand for novel visual effects in automotive coatings. This has resulted in the introduction of pearlescent or mica pigments (as described in U.S. Pat. No. 4,956,019); in surface colored aluminum flakes (as described in EP-A-33457) and in multicoat systems wherein mica and/or metal flakes are used with organic or inorganic pigments in two or more coating layers, chiefly to provide dichromatic hue shift effects. A typical example of such a multicoat system is described in EP-A-388931.

It is against this background of a constant search for coating systems possessing novel or unique color effects that the present invention has been developed.

SUMMARY OF THE INVENTION

Accordingly, the present invention provides a metal powder pigment comprising polished, preferably substantially spherical, atomized pigment particles of aluminum or an aluminum alloy which particles are facetted and have a median particle size of from 1 to 300 μm, preferably 3 to 75 μm, especially 5 to 40 μm and an aspect ratio of from 5/1 to 1.1/1, preferably 3/1 to 1.1/1, more preferably 2/1 to 1.1/1, still more preferably 1.5/1 to 1.1/1, especially 1.25/1 to 1.1/1. The polished atomized pigment particles have an increased reflectivity (as herein defined) with respect to unpolished atomized powder particles of at least 10%, preferably at least 15%, especially at least 30%.

Virtually all, that is at least 90%, of the individual particles of any given sample of the metal powder pigment of the invention are polished powder particles having the properties set out above. The individual polished particles can be regarded as slightly distorted, or facetted, spheres which have a greater surface area, and hence reflectivity, than do the unpolished atomized powder particles from which they are produced. This change in shape can clearly be evidenced by comparing microphotographs of the starting atomized powder particles and of the polished powder particles.

The polished atomized pigment particles generally have a reflectivity, or reflectance value, of at least 360, preferably at least 380, more preferably at least 400, when determined as the mid-point of a range of 12 measurements, taken by rotating a sample of the particles, which sample has a substantially planar horizontal surface, horizontally through 30° intervals between each measurement, by illuminating the sample with a substantially parallel beam of light from a low voltage tungsten filament lightbulb at an incident angle of 45° and collecting light reflected by the surface of the sample at 90° to the incident beam and 45° to the surface. For calibration or comparison purposes a white tile under the same conditions of measurement has a reflectivity of 662.

BRIEF DESCRIPTION OF THE DRAWINGS

A suitable reflectance measuring apparatus is shown in the accompanying drawing.

DESCRIPTION OF PREFERRED EMBODIMENTS

Illumination is provided by a tungsten filament low voltage bulb (1) powered by a Thurlby 15 V-4A variable output power controller (R. S. Components Ltd.) (not shown). A reflector (2) mounted behind the bulb provides a substantially parallel beam of light at 45° to the horizontal surface (3) of a metal powder sample, contained in a 3 inch (7.6 cm) diameter shallow metal cup (4). The incident beam path length is 17 cm. Light reflected from the sample is collected at 90° to the incident beam and 45° to the sample surface by an SL 200 Digital Lux Meter (Solex Ltd) (5), fitted with a 3.2 cm diameter, 11 cm long tube (6) over the detector (not shown), to exclude spurious light. The reflected beam path length is 22.6 cm.

The first part of Table 1 below gives the results, at a 95% confidence level, of 12 measurements carried out on each of several samples of a starting, that is atomized and unpolished, powder and of the powder pigment, that is containing the polished particles, derived therefrom, over a range of particle sizes relating to substantially spherical particles. To improve the uniformity of the measurements, each sample was gently flattened to provide a smooth horizontal surface. After each measurement, the shallow metal cup (4) containing the sample was rotated 30 degrees to take account of any slight surface irregularities. Also shown in Table 1 is the percentage increase in reflectivity for the polished particles over the unpolished particles, based upon the mid point for each of the ranges of values given. The second part of Table 1 shows the results for Examples 1 to 3 which follow later.

TABLE 1

| Particle size (μm) | Starting powder unpolished particles | | Powder pigment - polished particles | | % increase reflectivity |
| --- | --- | --- | --- | --- | --- |
| | Reflective values | | Reflective values | | |
| | range | mid-point | range | mid-point | |
| 31 | 334–340 | 337 | 371–381 | 376 | 11.6 |
| 24 | 312–322 | 317 | 367–373 | 370 | 16.7 |
| 19 | 318–326 | 322 | 353–375 | 364 | 13.0 |
| 8 | 348–360 | 354 | 426–442 | 434 | 22.6 |
| 5 | 335–349 | 342 | 380–394 | 387 | 13.2 |
| Example 1 | 318–328 | 323 | 414–422 | 418 | 29.4 |
| Example 2 | 278–284 | 281 | 364–372 | 368 | 31.0 |
| Example 3 | 324–334 | 329 | 404–410 | 407 | 23.7 |

(By way of comparison the average of 12 measurements of the reflectance value for a white tile, normally used as a reference standard for an Optronik color measurement apparatus, is 662).

The metal powder pigment of the invention, containing the polished metal particles, has been found to provide novel optical effects when used in single and multicoat surface coatings and to both reduce the severity of the phenomena known as "flow lines" and "weld lines" manifested when producing molded plastics articles and to provide satisfactory mechanical strength when incorporated in polymeric binder materials. The problem of flow and weld lines is particularly evident with metal flake pigments due to the tendency of the flakes to orientate during molding, particularly injection molding, in order to provide the least resistance to flow. This visibility of flow and weld lines arises because the light reflected by a flake oriented parallel to the surface is considerably greater than that reflected from a flake orientated vertically, since the latter presents a very such lower surface-area for reflection. The flow and weld lines adversely affect the appearance and mechanical strength of molded articles. In contrast, the products of the invention, due to their much lower aspect ratio, do not exhibit orientation effects in plastics moldings, and so therefore provide much less visible flow and weld lines. Moreover, when they are incorporated in ABS polymer by injection molding, the loss of impact strength which occurs is almost halved in comparison to that of the same ABS polymer pigmented by the same concentration of a conventional aluminum flake of the same median particle diameter.

The median particle size, or $D_{50}$, of metal powder pigments in accordance with the invention can be determined from particle size distribution data generated by such computerised equipment as the Malvern Mastersizer or Cilas Granulometre 715.

Whereas, as explained above, the wet ball milling of atomized metal powder in the production of metal flake pigment results in the substantially instantaneous formation of flakes when an atomized powder particle is trapped between the balls in a mill, the polished particles which constitute by far the greatest part, if not substantially all, of the metal powder pigment of the invention are formed from atomized powder particles by a process of attrition. The conditions under which this attrition or polishing action occurs are those of low ball collision energies, i.e. providing more of a polishing action, rather than sufficient energy to flake out the metal. Such conditions can be created by several different methods, for example by slow speed ball milling with a low ball charge, or by increasing the viscosity of the millbase in a ball milling regime appropriate to conventional flake production. Indeed good results are also obtained from a ball mill so full of grinding media as to limit their movement and therefore their impact energies. Other low energy polishing methods may be envisaged without departing from the spirit of the invention.

To provide further guidance on conditions under which the product of the invention may be obtained and to distinguish over conditions for the preparation of flakes, reference can be made to Table 2.

TABLE 2

| | POLISHED POWDER | FLAKE |
| --- | --- | --- |
| Volume of ball mill occupied by balls | 0.1–10% or >55% | 20–40% |
| Ball/metal/ratio | 1:1 to 4:1 | >8:1 |
| Viscosity of liquid | 0.015–0.025 Pas (15–25 centipoise) | 0.001 to 0.01 Pas (1–10 centipoise) |

The surface coatings envisaged in accordance with the invention will usually contain at least one layer comprising a polymeric resin binder and, as pigment, a polished metal powder pigment of the invention, optionally mixed with metal flake pigments. Thus, visual effects can be modified by using mixtures of polished metal pigment particles of the invention and metal flake pigments. The amounts of each ingredient can vary widely, depending upon such factors as the particle sizes of the pigments and whether they are added to a base coat or to one or more overlayers. Preferably the invention provides a multilayer coating system comprising a layer of base coat comprising a polymer binder and at least one base coat pigment, and up to four transparent overlayers each comprising a polymeric binder and optionally a pigment, wherein at least one of the transparent overlayers contains a metal powder pigment of the invention. Such multi layer coating systems exhibit multichromatic color shift effects of pleasing appearance and are particularly suitable as automotive coatings. In a preferred embodiment of such a multilayer coating system, the base coat contains a black pigment, with a non-black pigment and a metal powder pigment of the invention in the same or different overlying layer(s). For details of polymeric binders and base coat pigments that may be used in such surface coatings reference is directed particularly to EP-A-338931.

Due to the essentially spherical nature of the products of the invention, they are much less likely to suffer shear damage than metal flake pigments of comparable diameter. This enhanced degradation resistance is a considerable advantage in automotive paint applications where so called "ring line stability" is required. In radiation curing systems, the low opacity of the essentially spherical pigments results in faster cure rates, leading to greater throughput and energy savings. In addition, the low surface area relative to flake pigment dictates that, in the conventional paste delivery form, the metal content is very high in comparison to the corresponding metal flake pigment paste. This provides the formulator with much greater flexibility in the choice of compatible resins and solvents.

The shape of the pigment particles according to the invention also offers opportunities for the preparation of surface coatings having a textured surface, for either aesthetic or anti-slip applications. In such coatings, the median particle diameter of the pigment is chosen to be greater than the film thickness, thereby allowing the pigment particles to protrude through the film. Novel visual effects may be obtained by using as the coating film a conventional hammer finish paint.

A further application area for the products of the invention is in powder coating paint. The essentially spherical nature of the product of the invention overcomes a traditional disadvantage of flake pigments in such systems, namely lack of orientation.

The following Examples 1 to 3 illustrate the preparation of metal powder pigments in accordance with the invention, and Examples 4 to 8 illustrate the use of the metal powder pigments in various coating applications.

EXAMPLE 1

To a cylindrical ball mill, 30 cm long and 22 cm in diameter was charged 250 g of substantially spherical aluminum powder, having an aspect ratio of 1.36:1, a median particle diameter of 32.8 microns and a reflectivity, as herein defined, of 323. There were then added 1 kg of 3 mm dia. steel grinding media and 250 g oleic acid. The mill was sealed and rotated for 5 hrs at 52 rpm.

The polished product was recovered by washing out the mill contents with white spirit, collecting the metal in a filter and washing free of oleic acid with further portions of white spirit. A virtually quantitative yield of polished spherical powder was obtained, having a median particle diameter of 33.8 microns and a reflectivity of 418, 29.4% higher than the starting material (Table 1).

(To produce a flake pigment instead of the polished metal powder pigment using the ball mill of Example 1, it would be necessary to increase the grinding media weight (assuming the same period of operation) at least fourfold, reduce the amount of oleic acid to about one tenth and add white spirit to provide a mill bass viscosity of about 40% that of Example 1).

EXAMPLE 2

The method of Example 1 was repeated using a conventional air atomized aluminum powder of irregular shape (aspect ratio 2.47:1), 9.4 microns median particle diameter and a reflectivity of 281. After a milling time of 6.25 hours there was obtained a polished powder product of 9.9. microns median diameter and a reflectivity of 368, 31.0% higher than the starting material (Table 1).

EXAMPLE 3

A cylindrical ball mill of length 11.5 cm and volume 1132 ml was charged with 5436 g of steel grinding media to substantially fill the mill. The interstitial void volume was 405 ml. There were then added 143 g of substantially spherical aluminum powder of median particle size 19.5 microns, aspect ratio 1.28:1 and a reflectivity of 329, together with 143 g oleic acid and 143 g white spirit. The mill was sealed and rotated at 50 rpm for 4 hrs.

The polished product was recovered by washing out the mill contents with more white spirit, collecting the metal in a filter and washing free of oleic acid residues with further portions of white spirit. A virtually quantitative yield of polished metal powder product was obtained, having a median particle diameter of 20.6 microns and reflectivity of 407, 23.7% higher than the starting material. (Table 1).

EXAMPLE 4

A solid basecoat composition was prepared as follows:

80 parts A804 PPG Flowline Carbon Black prepared paint base, manufactured by PPG Industries (UK) Ltd., Birmingham, England was mixed with approximately 80 parts cellulose thinners.

The viscosity of the paint was checked and corrected to 30 seconds through Ford No. 4 cup ASTM D 1200 with further thinners. Aluminum Mill Finish 3003 H14 panels were sprayed with the basecoat composition paint to a film thickness of 5 µm on a dry film basis. The panels were oven dried at 80 degrees centigrade for approximately 1 minute before an additional 10 µm film of the base coat paint as measured on dry film basis was applied by spraying. Again the panels were oven dried at 80 degrees centigrade for approximately 1 minute before applying a third film of 10 µm dry film basis. The panels were allowed to dry before baking at 80 degrees centigrade for approximately 10 minutes. The stoved panels were then oversprayed with a metallic paint of the following composition:

10 parts polished spherical pigment of Example 1.
100 parts clear medium, manufactured by PPG Industries (UK) Ltd. Birmingham, England.
10 parts n-butylacetate Solvent approx. 50 parts MSB thinners manufactured by Herberts Ltd., Dagenham, England.

The pigment was mixed with n-butylacetate to predisperse the particles. The test clear medium was mixed into this predispersion in three approximately equal additions. The viscosity was checked and corrected using MSB thinners to 30 seconds through a Ford No. 4 cup ASTM D1200.

After spraying to a film thickness of 10 µm on a dry film basis, the panels were allowed to air dry before baking at 80 degrees centigrade for approximately 10 minutes. A transparent lacquer top coating was applied by spraying one coat (two passes wet on wet method) to a film thickness on a dry basis of about 30 µm. The transparent lacquer coating was prepared by mixing:

50 parts 2K MS Klarlack
25 parts 2K Hardner Normal
10 parts 2K Fast thinner all manufactured by Herberts Ltd., Dagenham, England.

The resulting coated panels exhibit a high degree of sparkle at all angles combined with lack of opacity in the polished spherical pigmented layer which allows the color of the basecoat to show through with good clarity.

EXAMPLE 5

Basecoated panels were prepared by the method of Example 4, substituting the carbon black paint base by a blue basecoat.

To the stoved panels there was then applied by spraying a metallic clearcoat paint prepared according to Example 4 in which the 10 parts of polished spherical pigment of Example 1 was replaced by a mixture of 2 parts of a similar polished spherical pigment of 19 micron median diameter and 6 parts of an aluminum flake pigment (SS3130 AR of Silberline Ltd.). The resulting stoved panels exhibited a subtle sparkle and a limited flop effect.

A similar, but brighter effect is obtained if the SS3130AR is replaced by an equal amount of a lenticular or "silver dollar" pigment, SSP303AR.

EXAMPLE 6

Example 5 was repeated by the substitution of the metallic pigment mixture by 5 parts of the product of Example 1 and 5 parts of a violet pearl, PPG. Deltron basecoat tinter D764 (PPG Industries (UK) Ltd.). As the pearl pigment also has low opacity, the resulting stoved panel showed the basecoat color with good clarity, but also provided a rich, deep, lustre, arising from the translucency of the pearl pigment and the pinpoint light reflection of the polished spherical pigment.

EXAMPLE 7

An intimate mixture of 10 g of an aluminum pigment according to the invention, having a median particle diameter of 27 microns, 0.5 g Chromophtal violet B pigment (CIBA GEIGY) and 1000 g crystal polystyrene pellets was injection molded at 160° C. to form key fobs. A deep violet color with subtle metallic sparkle was obtained. The weld line formed by division of the polymer melt within the tool, to create the hole for subsequent attachment of the key ring, was barely visible. In contrast, substitution of the essentially spherical pigment by an aluminum flake pigment of comparable particle diameter, produced a moulding of a less intense violet colour, having a very much more visible weld line.

EXAMPLE 8

The essentially spherical pigment of Example 7 was converted to granular form according to the method of EP-A-0134676 using an aldehyde resin carrier in the ratio of 50:50 metal pigment: carrier. The granules were subsequently reduced to powder capable of passing through a sieve of aperture size 105 microns, then incorporated at 4% by weight in a black polyester powder coating resin powder. The resulting mixture was applied to an earthed metal panel using a Nordson electrostatic spray system. After stoving at 180° C. for 10 mins there was obtained a subtly sparkling black finish with a low flop effect.

A more sparkling effect can be obtained by applying the pigment of this example in a clear powder coating applied over a stoved, colored base coat, itself applied by either a powder coating or liquid surface coating method.

We claim:

1. A metal powder pigment comprising atomized pigment particles of aluminum or an alloy thereof which particles have polished facets which increase their reflectivity with respect to unpolished unfaceted atomized metal powder particles by at least 10%, and have a median particle size of from 1 to 300 μm and an aspect ratio of from 5/1 to 1.1/1 wherein the particles having polished facets were made from said unpolished unfaceted atomized metal powder particles having an aspect ratio equal to or less than 5:1.

2. A metal powder pigment according to claim 1 wherein the polished particles have a median particle size of 3 to 75 μm and an aspect ratio of 2/1 to 1.1/1.

3. A metal powder pigment according to claim 1 wherein the polished particles have a median particle size of 5 to 40 μm and as aspect ratio of 1.5/1 to 1.1/1.

4. A metal powder pigment according to claim 1 wherein the atomized pigment particles have polished facets which provide an increased reflectivity of at least 15%.

5. A metal powder pigment according to claim 1 wherein the atomized pigment particles have polished facets which provide an increased reflectivity of at least 30%.

6. A multilayer coating system comprising a layer of base coat comprising a polymeric resin binder and at least one base coat pigment, and up to four transparent overlayers each comprising a polymeric resin binder and optionally a pigment, at least one of said transparent overlayers containing a metal powder pigment as claimed in claim 1.

7. A method of forming a single or multilayer coating system which comprises using as a pigment in at least one layer of said coating system a metal powder pigment as claimed in claim 1.

8. A method according to claim 7 wherein said metal powder pigment is present in at least one layer comprising a polymeric resin binder and said metal powder pigment.

* * * * *